United States Patent Office 3,514,610
Patented May 26, 1970

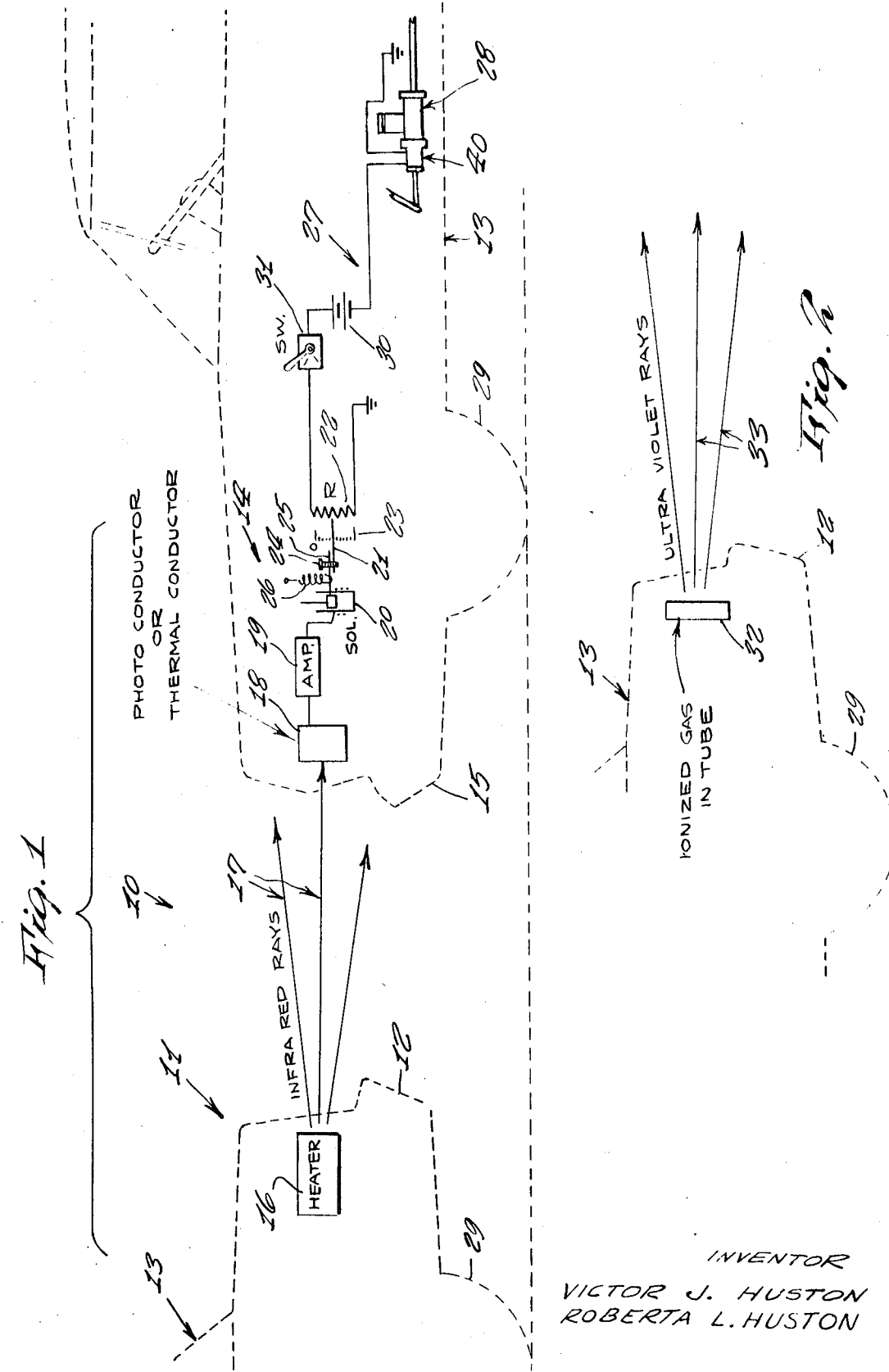

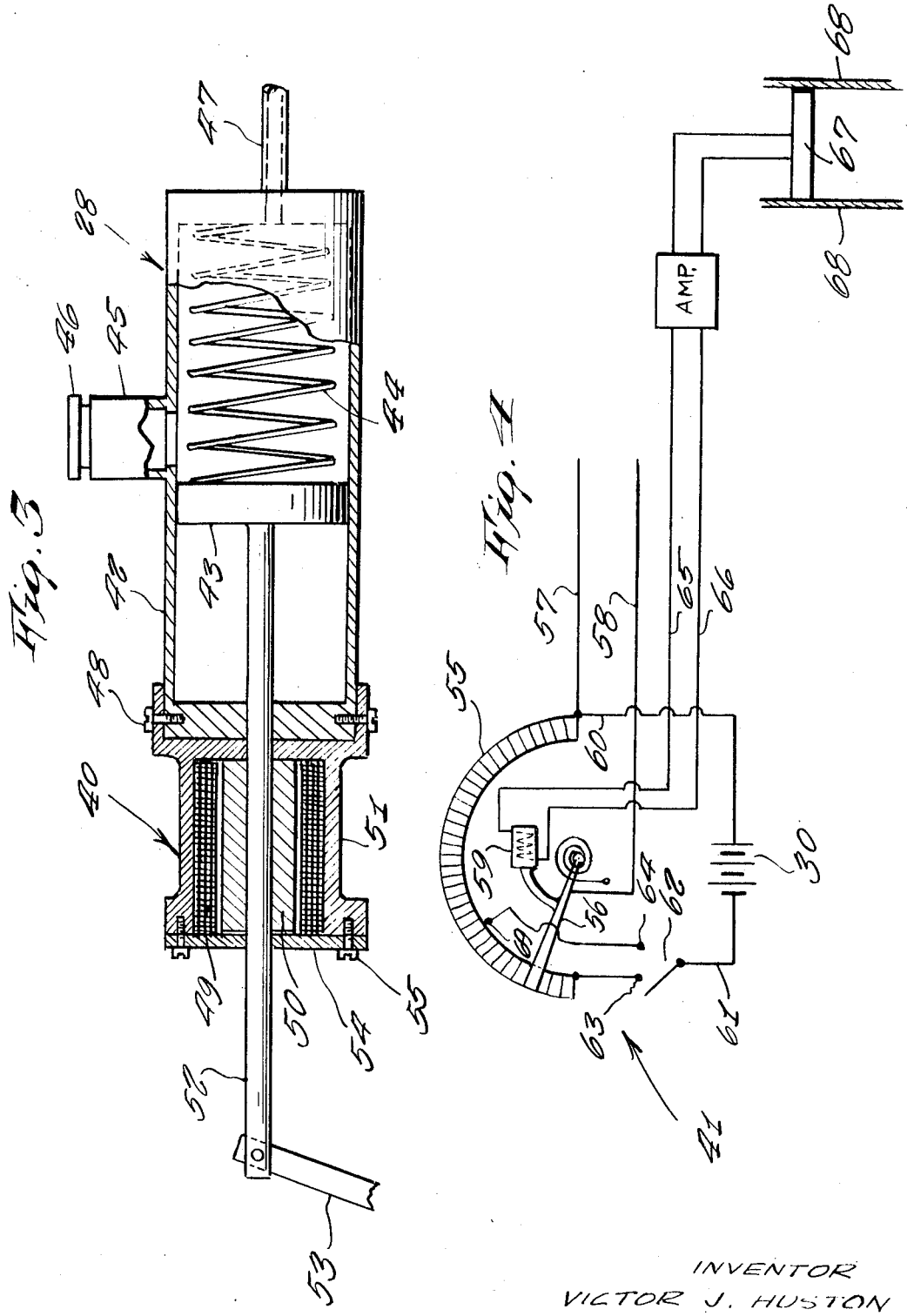

3,514,610
PHOTOCELL DEVICE TO PREVENT AUTOMOBILE REAR END COLLISIONS
Victor J. Huston and Roberta L. Huston, both of 2363 Dangl Road, Muskegon, Mich. 49444
Filed Jan. 4, 1967, Ser. No. 607,311
Int. Cl. G01j 1/32
U.S. Cl. 250—206                                  1 Claim

ABSTRACT OF THE DISCLOSURE

A sensing device for preventing automobile rear end collisions, the device comprising a ray emitting device in the rear end of an automobile which activates a photo or thermo-conductor in the front end of a following vehicle, the conductor operating a mechanism which activates the automobile brake in case the vehicles approach too close together.

---

This invention relates generally to automotive vehicles. More particularly it relates to automatic controls to prevent automobile rear end collisions.

A principal object of the present invention is to provide controls for automotive vehicles, and which have self-contained means to prevent automobile rear end collisions by automatic means that do not require the driver to place into operation in time of emergency.

Another object of the present invention is to provide a device to prevent automobile rear end collisions, and which has self-contained means to activate the automobile brake system to prevent an automobile from colliding with a vehicle in front thereof.

Yet another object of the present invention is to provide a device to prevent automobile rear end collisions which becomes automatically operative with increasing force as the vehicle approaches closer toward a vehicle in front thereof.

Other objects of the present invention are to provide a device to prevent automobile rear end collisions which is simple in design, inexpensive to manufacture, rugged in construction, easy to use and efficient in operation.

These and other objects will be readily apparent upon a study of the following specification and the accompanying drawing wherein:

FIG. 1 is a diagrammatical view of the present invention shown incorporated within a pair of automobiles;

FIG. 2 is a diagrammatical view of a modified form of a portion of the present invention;

FIG. 3 is a cross-sectonal view of a master brake cylinder and solenoid, and

FIG. 4 is a diagram showing a manual control.

Referring now to the drawing in detail, the reference numeral 10 represents a device to prevent automobile rear end collisions wherein there is a transmitting unit 11 located within the rear end 12 of an automobile 13 and wherein there is a receiving unit 14 within the front end 15 of the automobile 13.

As shown in FIG. 1 of the drawing, the transmitter unit 11 may comprise a heater 16 which emits a plurality of rearwardly extending infrared rays 17.

The receiving unit 14 comprises a photo conductor or thermo conductor 18 at the front end of the automobile where it is readily subject to the infrared rays from a vehicle in front thereof. An electromotive force developed within the conductor 18, due to the rays 17 is then amplified by means of an amplifier 19, the electromotive force then thus amplified, operating a plunger solenoid 20. A finger 21 attached in a suitable manner to a movable part of the solenoid is caused to move across a variable resistor 22. The finger 21 also moves across a graduated scale 23 and is adjustable relative thereto by a calibrating screw 24 between the finger 21 and an arm 25 carried by the solenoid and which is normally returnable to a zero position by means of a return spring 26.

The resistance 22 is within a circuit 27 that is connected to the piston of a master brake cylinder 28 to cause the piston to go down and cause a breaking action against the wheels 29 of the automobile. The circuit 27 is connected through the automobile battery 30 and through a switch 31 which is for the purpose of selectively using the device to prevent automobile rear end collisions in city traffic or country traffic. When driving in rural areas, the position of the switch 31 is different than when driving through congested city streets. For country driving, the full amount of the variable resistor will be used whereas for city driving a limit can be placed upon the riesistor at a suitable position to allow closer distance between automobiles. The switch 31 is a simple two position switch for accomplishing the same.

In operative use, when automobiles are travelling at a relatively safe distance apart, the infrared rays developed by a heater at the rear of an automobile will not effect the photo conductor of a vehicle at the rear thereof because the infrared rays are of insufficient strength to effect the same due to a suffiicently great distance apart between the vehicles. However, when the rear vehicle approaches too close to the vehicle in front thereof, the rays begin to effect the conductor so to set in motion the breaking system above described. Such safety distance may be determined generally at 25 to 30 feet, depending of course upon the normal speed permitted upon that highway. As the vehicles become closer together, the rays from the heater work at greater force against the conductor 18.

In a modified form of construction, shown in FIG. 2 of the drawing, the transmitor device comprises an ionized gas within a tube 32 which produces an ultra violet ray 33 which will likewise effect a photo conductor or thermo conductor as an infra-red ray.

In FIG. 3 a detailed structure is shown of the master brake cylinder 28 and its solenoid 40. In FIG. 4 the detailed structure is shown of the control 41.

The cylinder 28 includes a case 42 within which a piston 43 is slidable against a compression spring 44. A hydraulic fluid 45 filler and cap 46 are provided on the case 42. A hydraulic line 47 from the cylinder communicates with the brakes at the wheels. The solenoid 40 secured by screws 48 to the cylinder 28 includes a solenoid coil 49 and soft iron core 50 within a case 51. The piston 43 has a non-ferrous metal piston rod 52 that extends centrally through the solenoid and is connected by a linkage 53 to the brake pedal (not shown). A rear plate 54 is secured by screws 55 to the solenoid case 51.

The control 41 includes a variable resistor 55 having a slide finger 56, both of which are connected by leads 57 and 58 respectively to the master brake coil 49. A plunger coil 59 is mechanically connected to the slide finger. A lead 60 from one end of the resistor 55 is connected to one side of battery 30, the other side of the battery being connected by lead 61 to a toggle switch 62 that selectively may be connected to terminal 63 when the vehicle is used for country driving, or to terminal 64 when used for city driving.

The plunger coil 59 is connected by leads 65 and 66 to the amplifier and to a thermal semi-conductor 67 supported between mountings 68. Electron movement in the thermal semi-conductor 67 will be in direct ratio to the distance between the two automobiles. The resulting current is amplied at the amplifier and the plunger type solenoid on the variable resistor 55 will be actuated in relation to the distance between the two automobiles, thereby regulating the current in the variable resistor 55 which in turn increases or decreases the current flow in the master brake solenoid 40 which in turn gives a braking action, due to magnetic influence of a soft iron core 50 in the solenoid, to the piston rod 52. The closer that the automobiles are to each other, thus the greater the braking action.

The variable resistor 55 is designed with the limit 69 at a suitable position which cuts out part of the resistance for purpose of city driving, wherein the automobiles, driving at lower speeds, may approach each other more closely before the brakes become applied. For country driving, the full amount of the variable resistor 55 is used, due to the greater speeds of the vehicles.

While various changes may be made in the detail construction, it is understood that such changes will be within the spirit and scope of the present invention as defined by the appended claim.

I claim:

1. In a device to prevent automobile rear end collisions, a combination of a transmitter unit and a receiver unit, said transmitter unit being contained at the rear end of an automotive vehicle, said receiver unit being contained within a front end of another automotive vehicle, and said transmitter unit having means to transmit light rays rearwardly from the first said vehicle to said receiver unit within the other said vehicle at the rear thereof, said receiver unit comprising a photoconductor for receiving said light rays, said photoconductor being connected to an amplifier, said amplifier being connected to a plunger solenoid, an arm connected to a movable part of said solenoid, said arm supporting a finger that is moveable across a variable resistor, said resistor being within an electrrical circuit connected to means for mechanically activating apiston within a master brake cylinder, a switch and an automobile battery also being connected in said circuit, said switch comprising a two-way switch for selective operation for city traffic driving or country traffic driving, said switch when set to country driving allowing a use of the full amount of the variable resistor, and said switch when set to city driving allowing only a limited use of the amount of the variable resistor.

References Cited
UNITED STATES PATENTS

| | | | |
|---|---|---|---|
| 2,317,652 | 4/1943 | Toney | 250—206 |
| 2,699,834 | 1/1955 | O'Brien. | |
| 3,011,580 | 12/1961 | Reid. | |

RALPH G. NILSON, Primary Examiner

M. ABRAMSON, Assistant Examiner

U.S. Cl. X.R.

250—83.3